Feb. 27, 1940.  A. BERETVÁS  2,192,029
AUTOMATIC LOOM FOR THE MAKING OF KNOTTED RUGS
Filed March 14, 1938  8 Sheets-Sheet 7

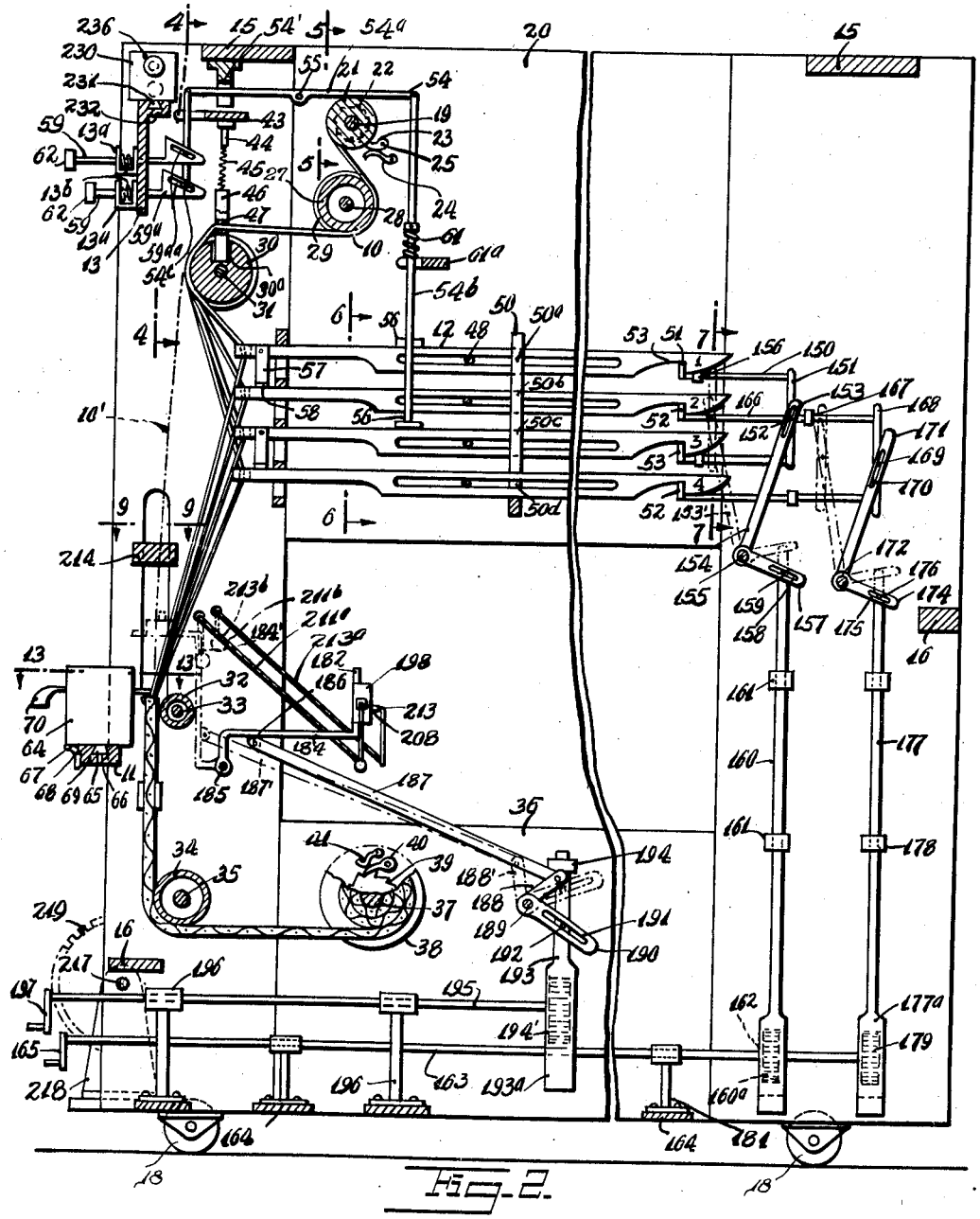

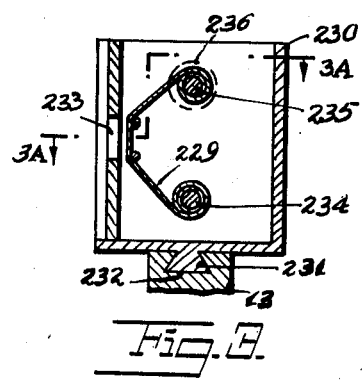
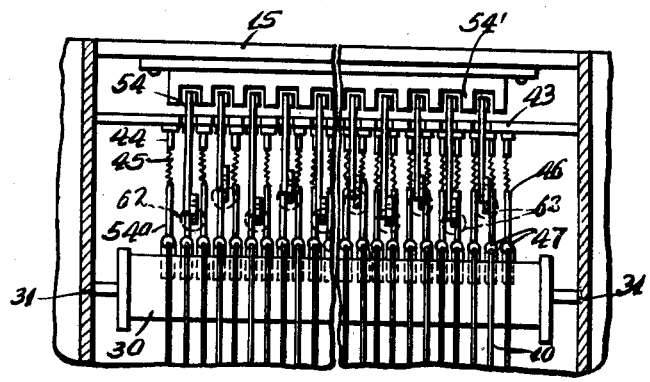
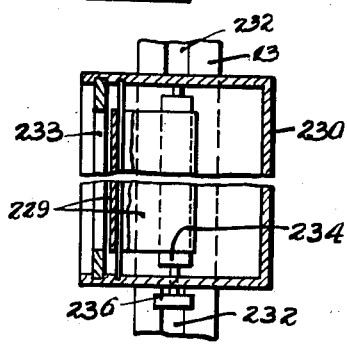
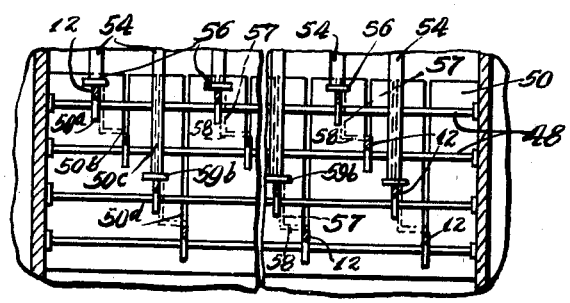
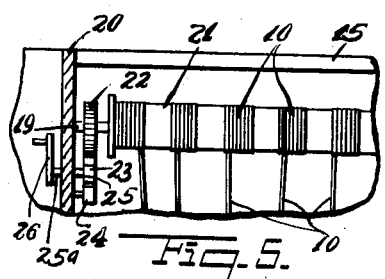
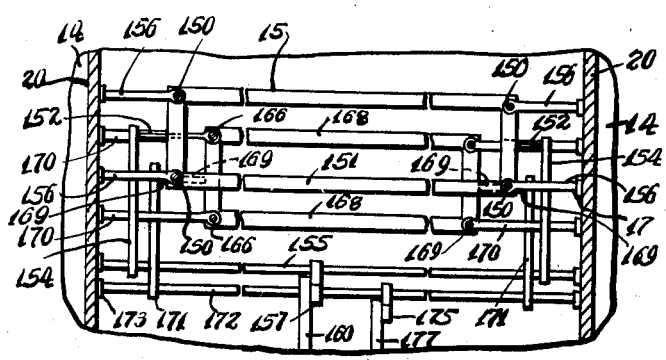

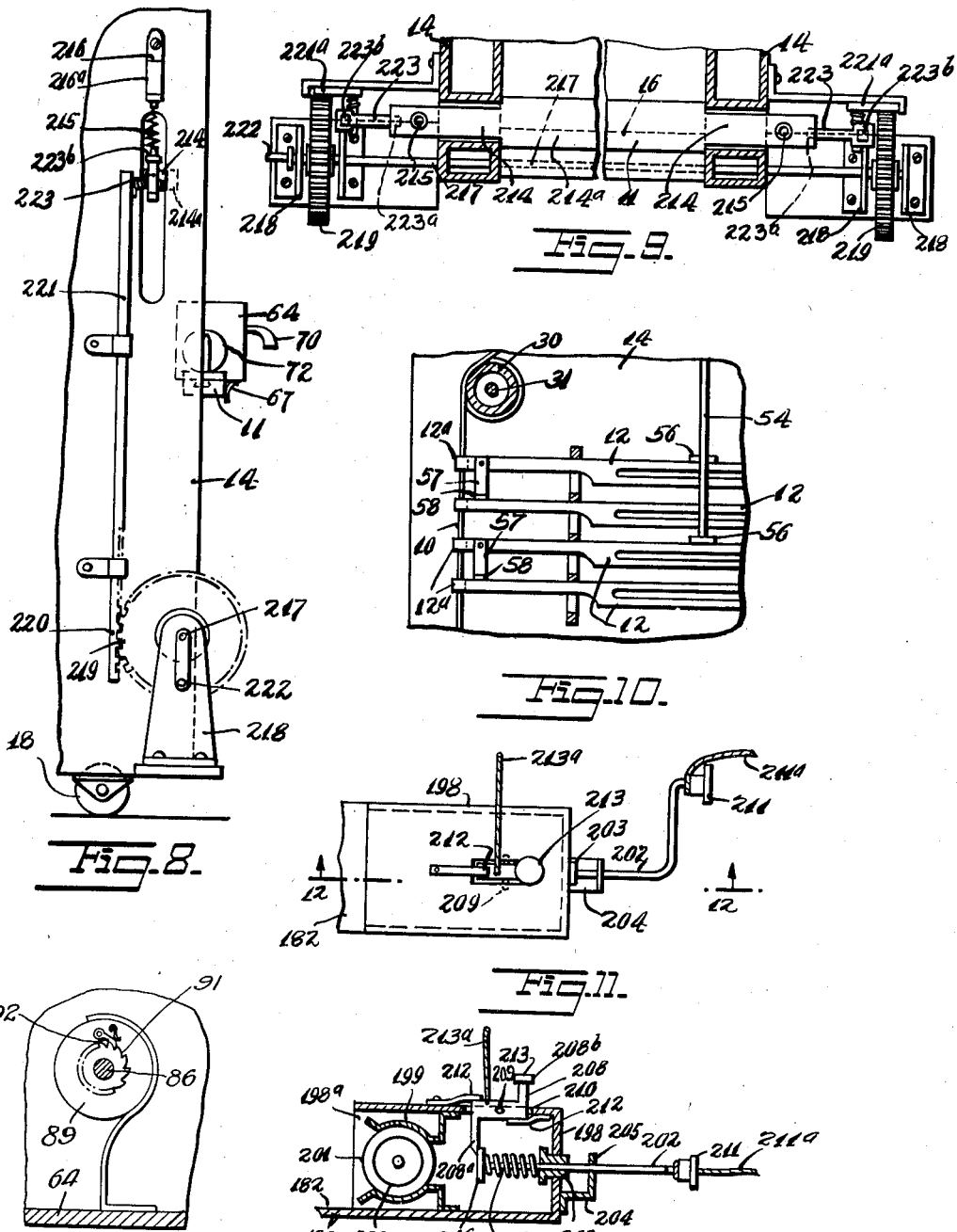

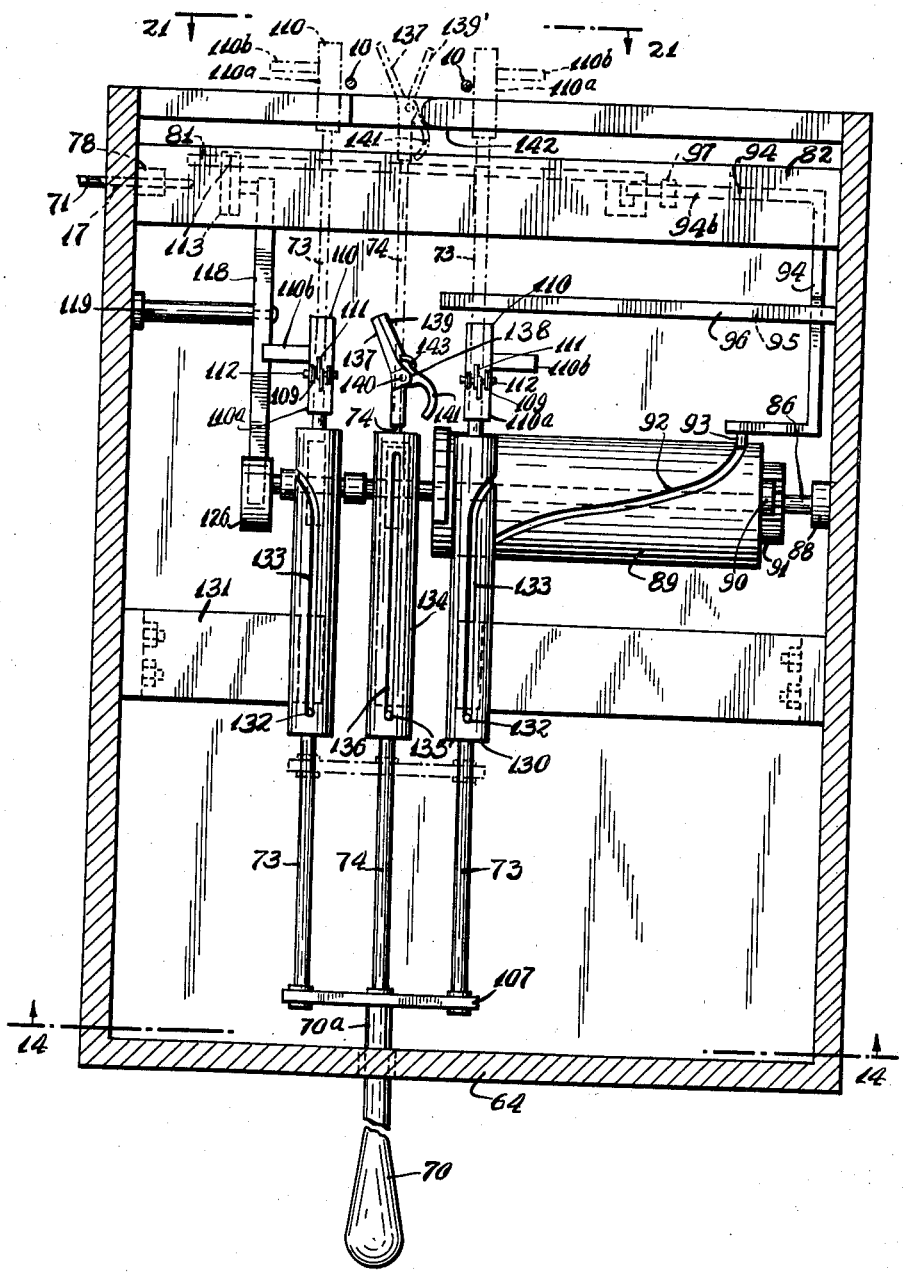

INVENTOR
Adalbert Beretvás
BY
ATTORNEY

Feb. 27, 1940. A. BERETVÁS 2,192,029
AUTOMATIC LOOM FOR THE MAKING OF KNOTTED RUGS
Filed March 14, 1938 8 Sheets-Sheet 8

INVENTOR
Adalbert Beretvás
BY
ATTORNEY

Patented Feb. 27, 1940

2,192,029

UNITED STATES PATENT OFFICE 2,192,029

AUTOMATIC LOOM FOR THE MAKING OF KNOTTED RUGS

Adalbert Beretvás, Brooklyn, N. Y.

Application March 14, 1938, Serial No. 195,756

20 Claims. (Cl. 139—5)

This invention relates to new and useful improvements in an automatic loom and method for the production of knotted oriental rugs and tapestries.

More specifically, the invention proposes the construction of an automatic loom for the production of knotted oriental rugs and tapestries characterized by a frame for supporting and tensioning a plurality of vertical yarns in a manner so that short lengths of yarn may be knotted around adjacent vertical yarns for forming the design of the rug or tapestry.

Another object of this invention is the provision of a device entirely automatic in nature which is adapted to draw a length of yarn from a supply and position it with relation to the vertical yarns for tying the said knot.

Still further it is proposed to characterize the automatic device by a pair of fingers for gripping and extending a length of yarn to a position adjacent said vertical yarns, after which the fingers may be rotated with relation to each other to twist the ends of the length of yarn in back of the adjacent vertical yarns, after which a third finger grasps the adjacent ends of the length of yarn for drawing these ends back to complete the said knot.

Another object of this invention is the provision of a means for slidably supporting the automatic knot tying device upon the front of the loom so that it may be selectively moved to desired positions along the width of the rug or tapestry being formed for forming the knots in the desired positions.

Still further it is proposed to support the vertical yarns in a common plane and provide a means for moving the yarns out of the common plane.

Another object of the invention is to characterize the aforesaid means by a plurality of slidably mounted fingers having openings at their outer ends through which said vertical yarns pass and which are adapted to be released when desired so that they may move forward to move certain of said vertical yarns forward to permit the knots to be tied or a shuttle to pass therebetween for extending a horizontal yarn between said vertical yarns after a complete row of knots has been completed.

Still further it is proposed to characterize the shuttle by a spring pressed plunger which is adapted to shoot a spool having yarn thereon between the spaced rows of vertical yarns.

Still further it is proposed to characterize the loom by a slidably supported weight which is adapted to be released for pressing the completed knots and horizontal yarns into position for tightly positioning the rows of knots one next to another.

As a further object of this invention it is proposed to create a design for a desired rug or tapestry and to prepare a list of the identical colors of the knots in each horizontal row for assisting the operator in forming the knots upon the proper adjacent vertical yarns.

Still further it is proposed to provide a casing slidably supported across the top of the loom and into which the prepared list of identical colors may be supported in a convenient position to permit the operator to know the points at which knots of a desired color are to be formed.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure.

Fig. 2 is a sectional view on the line 2—2 of Fig. 1.

Fig. 3 is a sectional view on the line 3—3 of Fig. 1.

Fig. 3A is a sectional view taken on the line 3A—3A of Fig. 3.

Fig. 4 is a sectional view on the line 4—4 of Fig. 2.

Fig. 5 is a sectional view on the line 5—5 of Fig. 2.

Fig. 6 is a sectional view on the line 6—6 of Fig. 2.

Fig. 7 is a sectional view on the line 7—7 of Fig. 2.

Fig. 8 is a sectional view on the line 8—8 of Fig. 1.

Fig. 9 is a sectional view on the line 9—9 of Fig. 2.

Fig. 10 is a view similar to a portion of Fig. 2 but illustrating another position of the parts.

Fig. 11 is a sectional view on the line 11—11 of Fig. 1.

Fig. 12 is a sectional view on the line 12—12 of Fig. 11.

Fig. 13 is a sectional view on the line 13—13 of Fig. 2.

Fig. 19 is a sectional view on the line 19—19 of Fig. 14.

Figure 1:
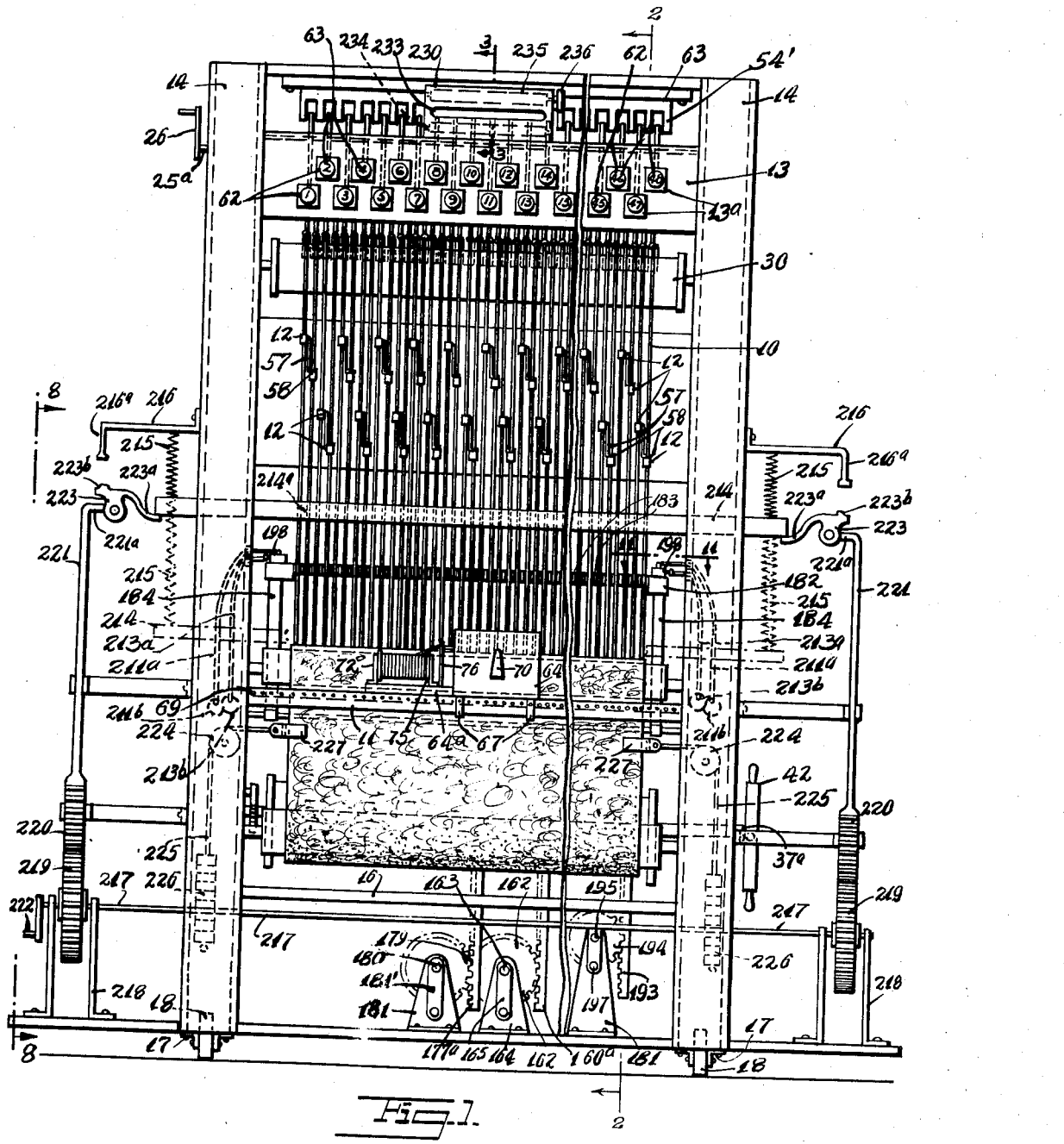
Fig. 1 is a front elevational view of an automatic loom for the production of knotted oriental rugs and tapestries constructed according to this invention.
Figure 14:
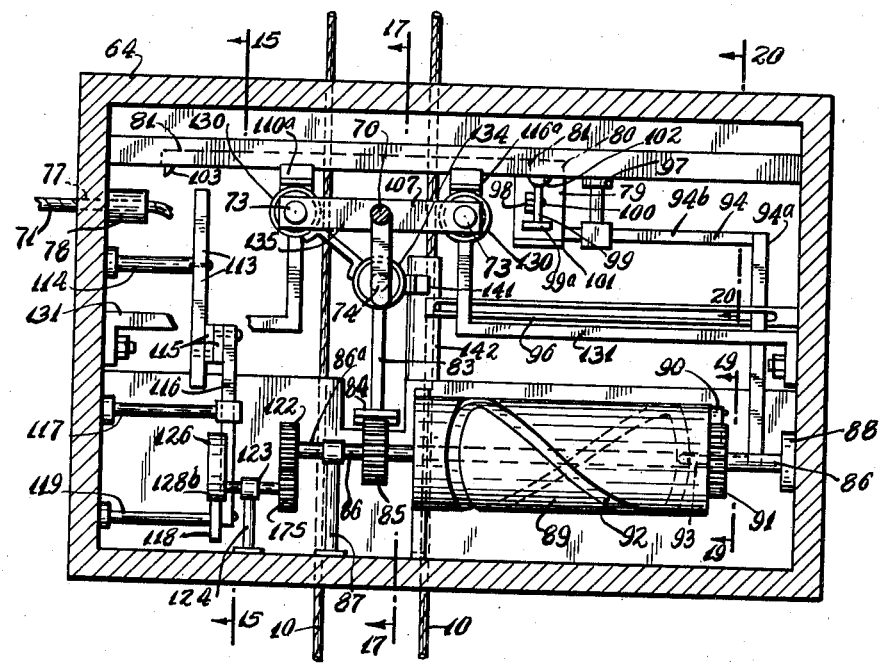
Fig. 14 is a sectional view on the line 14—14 of Fig. 13.

The automatic loom for the production of knotted oriental rugs and tapestries, according to this invention, comprises a means for tensioning and supporting a plurality of vertical yarns 10 in a common plane. A track 11 extends transversely across the vertical yarns 10. A finger 12 for each of the vertical yarns has an opening 12a through which the yarn passes. Means is provided for slidably supporting the fingers 12 and means is also provided for holding the fingers selectively rearwards for drawing the vertical yarns selectively out of the said common plane. A keyboard 13 is formed with a means for releasing the fingers to move said vertical yarns 10 from their rearward position in adjacent pairs. A still further means is movably mounted on the track 11 for tying knots of yarn material upon said adjacent pairs of the vertical yarns. A means is provided for releasing in a group all of the "odd" fingers from their rearward positions, and another means is provided for releasing in a group all the "even" fingers for moving a shuttle with a horizontal yarn between the "odd" and "even" vertical yarns when one group is rearward and the other is forward.

Four vertical channel members 14 are connected together at their top ends by horizontal connecting pieces 15 and at their bottom ends by horizontal connecting pieces 16. The bottom ends of the vertical channel members 14 are supported upon plates 17. Wheels 18 are rotatively mounted upon the plates 17 for facilitating the movement of the loom when it is so desired.

The means for tensioning and supporting a plurality of vertical yarns includes a horizontal shaft 19 having its ends rotatively supported on top plates 20 extended between the top ends of the vertical channel members 14. A plurality of spools 21 having the yarns 10 wound thereon are fixedly mounted on the shaft 19. The shaft is formed with a means for preventing the yarns 10 from unrolling therefrom. This means comprises a ratchet wheel 22 fixedly mounted on the shaft 19 and which is adapted to be engaged by a pawl 23 pivotally supported upon the plate 20. A spring 24 is attached to the plate 20 and is adapted to engage against the pawl 23 for urging it into an operative position with relation to the ratchet wheel 22. The pawl 23 is mounted upon a pin 25 which extends through the plate 20. A handle 26 is mounted on the outer end 25a of the pin 25 by which the pawl may be moved backwards against the holding action of the spring 24 to disengage the pawl 23 from the ratchet wheel 22 to permit the shaft 19 to turn so that the yarns 10 may be unwound therefrom.

The yarns 10 extend downward over a roller 27 rotatively supported upon a shaft 28 having a plurality of grooves 29 which are adapted to hold the yarns 10 in spaced positions. From there the yarns 10 extend over a front roller 30 fixedly supported upon a shaft 31, fixedly supported between the forward pair of channel members 14. The knots are adapted to be formed upon the vertical yarns 10 in the vicinity of the roller 32 and the completed portions of the rug or tapestry extend downward over a roller 34 rotatively supported upon a shaft 35 extending between the channel members 14 below the shaft 33. To the rear of the shaft 35 plates 36 are extended between the channel members 14 below the plates 20 and a shaft 37 is rotatively supported between the plates 36. A large spool 38 is fixedly attached upon the shaft 37 and is adapted to have the completed portion of the rug or tapestry rolled thereon. A means is provided for limiting the rotation of the spool 38 in one direction only, and that direction being the one in which the rug will be wound thereon. This means comprises a ratchet wheel 39 fixedly mounted on the shaft 37 and adapted to be engaged by a pawl 40 pivotally supported upon one of the plates 36. A spring 41 is attached to the plate 36 adjacent the pawl and engages against the pawl 40 for urging it into an operative position with relation to the ratchet wheel 36.

The other end 37a of the shaft 37 extends from one of the plates 36. The extended end 37a of the shaft 37 is provided with a wheel 42 by which the shaft 37 may be rotated for rolling the completed portions of the rug or tapestry upon the spool 38.

A bar 43 (Figs. 2 and 4) extends between the forward pair of vertical channel members 14 and is formed with a plurality of depending fingers 44, one for each of the vertical yarns 10. A spring 45 is attached to the bottom end of each of the fingers 44. A tensioning strip 46 is mounted on the bottom end of each spring 45 and each strip is formed with an opening 47 through which the yarn 10 extends. The roller 30 is formed with an elongated slot 30a into which the bottom ends of the strips 46 extend. This slot 30a acts as a guide for limiting the movement of the strips 46 to the vertical. When the fingers 12 are in their forward position the spring 45 will contract to take up the slack in the yarn 10 for tensioning it as illustrated by the dot and dash lines 10' in Fig. 2 so that the knots may be conveniently formed thereon. When a complete row of knots has been formed and it is desired to move the yarns 10 downwards the handle 26 is moved to disengage the pawl 23 from the ratchet wheel 22 and the shaft 37 is rotated by the wheel 42 for rolling more of the completed rug or tapestry upon the spool 38 so that more of the yarn 10 will be unrolled from the spools 21.

A plurality of rods 48 extend between the plates 20 and the fingers 12 are formed with elongated slots 49 which are adapted to engage rods 48 for slidably supporting the fingers 12 upon these rods. The rods 12 are mounted in a staggered relation with each other upon the rods 48 (see Fig. 1) so that they will not strike each other in either their rearward or forward movement. A plate 50 is mounted between the plates 20 to the rear of the rods 48 and is formed with slots of varying depths 50$^a$, 50$^b$ and 50$^d$ against the bottom of which the portion of the fingers 12 to the rear of the rods 48 are adapted to abut for preventing the fingers 12 from tilting rearwards. The rear ends of all the "odd" numbered fingers are connected together by rods 51 and the rear ends of all the "even" fingers are connected together by rods 52. The rear ends of the fingers 12 are formed with cam cutout portions 53 which are adapted to engage the rods 51 and 52 for holding the fingers 12 in their rear position.

The keyboard and means for releasing said fingers to move said vertical yarns from their rearward position in adjacent pairs comprises substantially U-shaped levers 54 having one of their intermediate portions 54$^a$ rotatively supported upon a shaft 55 extending between the top pair of plates 20. The other end 54$^b$ of the U-shaped levers 54 are provided with enlarged ends 56 which are adapted to strike the top of every "odd" finger 12 for releasing the "odd" fingers from their rods 51. The front ends of the "odd" fingers 12 which are adapted to be struck by the enlarged heads 56 are formed with members 57 which connects these "odd" fingers 12 with their next adjacent "even" fingers 12. These members 57 have one of their ends fixedly attached to the "odd" fingers 12 which are adapted to be struck by the enlarged heads 56 and are formed at their other ends with foot portions 58 which are adapted to strike against the top edge of the next adjacent "even" finger 12 for releasing the fingers in adjacent pairs.

The keyboard 13 is provided with a plurality of plungers 59, one for each adjacent pair of vertical yarns 10. These plungers are slidably supported through the keyboard 13 and U-shaped brackets 13$^a$ attached to the front face of the keyboard 13. Springs 13$^b$ operate between the plungers 59 and end portion of the brackets 13$^a$ for urging the plungers 59 outwards. The plungers 59 are formed at their inner ends with enlarged heads 59$^a$ having inclined elongated slots 59$^{aa}$ into which the ends 54$^c$ of the levers 54 are adapted to engage for pivoting the levers against the holding action of a spring 61 extending between a portion of the U-shaped lever 54 and support piece 61$^a$ extending between the plates 20. At their outer ends the plungers 59 are formed with buttons 62 which are provided with numbers 63 for identifying these plungers so that the correct one may be pressed inwards at the correct time. When the plungers 59 are urged inwards they will strike against the corresponding U-shaped lever 54 and pivot it against the action of the spring 61 to cause the enlarged head 56 to strike and pivot its "odd" finger 12 to disengage the finger from the rod 51. When the "odd" finger 12 is pivoted by the action of the U-shaped lever 54 it will also pivot its next adjacent "even" finger as the foot portion 58 of the member 57 will bear against the next adjacent "even" finger 12 and disconnect it from its rod 52.

The tension upon the arms 12 caused by the spring 45 will cause the fingers 12 to move forward the moment the cam cutouts 53 have been disengaged from the rods 51 and 52 to permit the yarns 10 to move to the position illustrated by the dot and dash line 10' in Fig. 2, in which the adjacent yarns will be in a position for the formation of the knot.

The means for forming the knots of yarn material upon the adjacent pairs of vertical yarns 10 comprises a carriage 64 in the form of a container which is formed on its bottom side with a downwardly extending projection 65 adapted to engage a complementary groove 66 formed in the track 11 for slidably supporting the carriage 64. The bottom of the carriage is formed with springs 67 having projections 68 which are adapted to engage complementary openings 69 for holding the carriage 64 in fixed positions thereon. The openings 69 are numbered to correspond with the numbers 63 on the keyboard 13 so that the container may be aligned with the proper yarns 10 which have been moved forward.

An extendible handle 70 is mounted on the carriage 64 and a means is operated by the handle for drawing a length of yarn 71 from a supply spool 72. A pair of fingers 73 are manually extendible by the handle 70 for gripping the length of yarn 71 at spaced positions outside of the said pair of vertical yarns 10. A means is provided for cutting off a portion 71' of the yarn 71, and a means is provided for causing the fingers 73 to turn in the extended position and move the ends of the cut off portion 71' of the yarn, in back of the yarns 10, and a third finger 74 operable by the handle 70 extends between the pair of vertical yarns 10 and pulls the ends between the vertical yarns to form a knot when the handle 70 is retracted.

The carriage 64 is formed with an outwardly extending portion 64$^a$ upon one of its sides upon which studs 75 are mounted. The spool 72 is rotatively supported between the studs 75 and the yarn 71 passes from the spool 72 over an upwardly extending member 76 and passes through an opening 77 formed in the side of the carriage 64. From the opening 77 the yarn 71 passes frictionally through a tube 78 extending from the inner side of the opening 77.

The means operated by the handle for drawing a length of yarn from the supply spool across a pair of vertical yarns 10 comprises a clip 79 formed at its upper end with a tongue-shaped element 80 which is adapted to engage a complementary groove 81 formed in a track element 82 extending between the side walls of the carriage 64. A means is provided for moving the clip 79 along the length of the groove 81 and comprises downwardly extending support elements 83 attached to the bottom side of the finger 74. A rack 84 is mounted upon the bottom end of the support elements 83 and is adapted to engage a gear 85 fixedly attached to a shaft 86 rotatively supported between bearings 87 and 88. A sleeve 89 is freely supported upon the shaft 86 and is formed at one of its ends with a pawl 90 which is adapted to engage a ratchet wheel 91 for fixedly connecting the sleeve 89 with a shaft 86 so that the sleeve 89 will move therewith when the handle 70 is pushed inward. When the handle 70 moves outward the pawl 90 will idle over the teeth of the ratchet wheel 91 permitting the sleeve 89 to remain still on the backward movement of the handle.

The sleeve 89 is formed with an 8-shaped cam groove 92 which is adapted to be engaged by a follower 93 attached to one end of a U-shaped member 94. The intermediate portion 94ª of the U-shaped member 94 is slidably engaged through an elongated slot 95 formed in a bracket 96 attached to one wall of the carriage 64 to assist in supporting the U-shaped member 94. The end 94ᵇ slidably engages through a bearing 97 fixedly secured to the bottom face of the track 82 at the end of the groove 81. The very end of the arm 94ᵇ is fixedly attached to the clip 79 for moving the clip the length of the groove 81 and backwards when the sleeve 89 has made two complete revolutions. On the first revolution the clip 79 will be moved from one end of the groove 81 to the other end of the groove, and upon the next complete revolution the clip 79 will be moved back to its starting position. The clip 79 is formed with a lug 98 upon which a lever 99 is pivotally supported by a pin 100. The bottom end of the lever 99 is formed with an enlarged portion 99ª which is adapted to abut an inwardly extending portion 101 formed on the body of the clip 79 for clamping the yarn 71 therebetween. A spring 99' is mounted upon the pin 100 and urges the lever 99 into a position in which the enlarged portion 99ª will abut the inwardly extending portion 101. The bottom of the track 82 near the end of the groove 81 is formed with a cam 102 upon which the free end of the lever 99 is adapted to engage for moving the lever 99 against the holding action of the spring to release the yarn.

When the clip 79 is moved along the length of the groove 81 the free end of the lever 99 will engage upon a cam 103 attached to the bottom face of the track 82 in the vicinity of the tube 78. A portion of the yarn 71 is adapted to extend from the tube 78 and when the clip 79 is opened by the cam 103, this extended portion will engage between the portions 99ª and 101. When the clip 79 is moved still further to the very end of the groove 81 the free end of the lever 99 will pass the cam 103 and snap to the closed position to tightly hold the end of the yarn 71. On the backward movement of the clip 79 the free end of the lever 99 will abut against the face of the cam 103 and pivot it into the opening 104 formed in the track 82. The cam 103 is pivotally supported upon a hinge 105 so that this cam 103 will pivot out of its operative position upon the backward movement of the clip 79 to prevent it from opening the clip to disengage the yarn 71 therefrom. A leaf spring 106 is mounted within the opening 104 and is adapted to extend the cam 103 from the opening 104 so that it may be moved to its operative position upon the forward movement of the clip 79.

While the handle 70 is being pressed inwards to move the clip 79 it is also moving the fingers 73. The finger 74 is fixedly attached at its front end to a plate 107 and the rear ends of the fingers 73 are rotatively supported on the same plate 107. This plate is fixedly attached to the inner end 70ª of the handle 70 so that when the handle is moved inwards all of the fingers will move correspondingly. At their rear ends the fingers 73 are formed with clips for tightly grasping the extended portion of the yarn 71. These clips comprise fixed clamp jaws 108 attached to the inner ends of the finger 73. Upwardly extending lugs 109 are formed upon the jaws 108 and pivotally support a movable jaw element 110. The rear end of the jaw element 110 is formed with a cam tail 110ª which is adapted to ride across the bottom face of the track 82 for moving the jaw element 110 to its open position so that it will grip the extended portion 71' of the yarn 71. A spring 111 is mounted on a pivot pin 112 of the jaw 110 and is adapted to move this jaw into its closed position. When the clip 79 is almost back to its normal position the finger 73 will have moved into a position in which the cam tail 110ª of the cam clip will strike the track element 82 to move this clip to its open position so that the piece of yarn 71' will pass into the open jaw of this clip. When the cam 110ª passes the bottom of the track 82 the spring 111 will urge the jaw 110 into its closed position to fixedly hold the piece of yarn 71' in position therebetween.

A means is provided for cutting off the extended portions 71' of the yarn 71 and consists of a pair of scissor jaws 113 pivotally supported upon a bracket 114 attached to the wall of the carriage 64 below the tube 78. Links 115 are pivotally supported upon the bottom ends of the scissor jaws 113 and these links 115 extend inwards and are pivotally connected with a downwardly extending link 116 which is vertically slidably supported in a bracket 117. The bracket 117 is attached to the wall of the carriage 64 below the bracket 114. A horizontal link 118 is pivotally supported intermediate of its ends upon a bracket 119 and is provided at its end 118ª with an elongated slot 120 which is adapted to engage a pin 121 attached to the bottom end of the vertical link 116. A means is provided for pivoting the horizontal link 118 to urge the vertical link 116 upwards to close the scissor jaws 113 and cut off the extended portion 71' of the yarn 71.

This means comprises a small gear 122 attached to one of the ends 86ª of the shaft 86. A small shaft 123 is rotatively supported in a bracket 124 secured to the bottom wall of the carriage 64. A large gear 125 is attached to one end of the shaft 123 and meshes with the gear 122. A cam 126 is attached to the other end of the shaft 123 and is adapted to abut against the end 118ᵇ of the horizontal link 118. The horizontal link 118 near the end 118ᵇ is formed with an upwardly extending peg 127 and a peg 128 is attached to the side wall of the carriage 64 above the peg 127. A spring 129 acts between the pegs 127 and 128 to urge the horizontal lever 118 into a position in which the end 118ᵇ will always abut against the cam 126. The ratio between the gears should be 2:1; that is, the gear 125 should be twice as big as the gear 122 so that the cam 126 will only move the horizontal arm 118 to close the scissor jaws 113 once for each two rotations of the shaft 86. The cam 126 should be so positioned upon the shaft 123 with relation to the groove 92 to pivot the horizontal lever 118 when the clip 79 reaches its normal position and has extended the yarn 71 between the vertical yarns 10.

Further movement of the handle will cause the fingers 73 to move the clips to a position adjacent the yarns 10. Each of the fingers 73 slidably and rotatively extends through a sleeve 130 which are fixedly mounted on brackets 131. The brackets 131 are mounted on the side walls of the carriage 64. Thus the sleeves 130 are always in a fixed position with relation to the fingers 73. Each of the fingers 73 is formed with an upwardly extending projection 132 which is adapted to engage a cam slot 133 formed in the sleeve 130. The finger 74 is also slidably supported through a sleeve 134 which is fixedly attached to one of the sleeves 130 by a bracket 135. The finger 74 is also provided with an upwardly extending projection 135' which engages an elongated slot 136 formed in the sleeve 134 for holding the finger 74 in a fixed position to prevent it from rotating with relation to the sleeve 134. The outer end of the finger 74 is formed with a fixed jaw 137 having outwardly extending lugs 138 upon which a movable jaw 139 is pivotally supported by means of a pin 140. The inner end of the movable jaw 139 is formed with a cam tail 141 which is adapted to engage a cam 142 in the extended position of the finger 74 for opening the jaws to the position illustrated by the dot and dash lines 139' of Fig. 13. A spring 143 is mounted upon the pivot pin 140 of the movable jaw 139 and is adapted to normally urge this jaw into its closed position.

The cam slots 133 in the sleeve 130 are of a particular formation to twist the fingers 73 when they reach their fully extended positions to turn the ends of the portion of yarn 71' behind the vertical yarns 10. The bottom jaw elements 110 of the clips on the fingers 73 are formed with outwardly extending projections 110a which are adapted to direct the ends of the portion of yarn 71' inward and the cam slot 133 is adapted to lift the projections 110a with relation to the clip on the finger 74 to lift the ends of the portion of yarn 71' above the top edges of the jaws 137 and 139 on the finger 74 and then lower the projections 110a to drop the ends of the yarn 71' between the jaws 137 and 139. This lifting and dropping of the ends of the yarn 71' is accomplished when the clips reach their fully extended positions illustrated by the dot and dash lines in Fig. 13. When the clips reach this dot and dash position the handle can no longer be pressed inwards and is returned to its normal position. When the handle 70 is moved back the slightest bit, the cam tail 141 will ride off the cam 142 and the jaws 137 and 139 will immediately snap closed upon the ends of the yarn 71' and draw these ends between the vertical yarns 10 to form the knot. These jaws 137 and 139 are of a sufficient length to clamp closed on the ends of the yarn 71'. When the handle is being moved backwards the clips on the fingers 73 will slip from the yarn 71' permitting the clip on the finger 74 to tightly draw the knot.

After the handle 70 has moved to the position in which the knot is drawn tight the ends of the yarn 71' will slip from between the jaws 137 and 139 and the knot will be completed. The handle 70 will then move all the way back to its normal position and the rack 84 will merely pass over the gear 85 to idle the shaft 86 back to its normal position without turning the sleeve 89. Upon the next forward movement of the handle 70 the extending processes of the yarn 71, the cutting off of the extending portions 71', the engagement of the extended portion between the clips on the fingers 73, and the drawing in of the ends by the clip on the finger 74 will be repeated. This process is repeated for each knot.

After the desired number of knots of one color have been formed a means is provided for drawing the fingers 12 back to their normal position so that the proper fingers may be extended for the next group of knots. This means comprises rearwardly extending fingers 150 attached to the rods 51 of the "odd" fingers 12. These rearwardly extending fingers 150 are attached to a rectangular frame 151 which is provided at its outer ends with studs 152 which are adapted to engage elongated slots 153 formed in levers 154 fixedly attached to a shaft 155 which is rotatively supported between the rear pair of vertical channels 14. The rods 150 are slidably supported in bearings 156 attached to the plates 20 for slidably supporting these fingers 150. There are two levers 154, one for each end of the rectangular frame 151. The shaft 155 is provided with a lever 157 intermediately of its ends. The lever 157 is formed with a slot 158 adapted to engage a pin 159 attached to a vertical member 160 slidably supported in bearings 161 attached to the channel members 14. The bottom end of the vertical member 160 is formed with a rack portion 160a which is adapted to engage a gear 162 attached to a shaft 163 which extends to the front of the loom and which is rotatively supported in bearings 164 supported upon a portion of the bottom of the loom.

The front end of the shaft 163 is provided with a handle 165 by which the shaft 163 may be rotated for rotating the gear 162 to move the rack portion 160a upwards. When the rack 160a moves upwards the vertical member 160 will move correspondingly to rotate the shaft 155 which will pivot the lever 153 to the position illustrated by the dot and dash lines 153' in Fig. 2. When the lever 153 moves to the dot and dash position the frame 151 will move correspondingly to cause the rods 51 to engage the cam cutouts 53 formed on all the "odd" levers 12 so that when the handle 165 is rotated in the opposite direction the vertical member 160 will move downwards to move the frame 151 back to its normal position and draw all the "odd" fingers 12 rearwards.

There is also a means for moving all the "even" fingers backwards and comprises rearwardly extending fingers 166 attached to the back of the rods 52 upon which all the "even" fingers 12 are engageable. The rearwardly extending fingers 166 are slidably supported in bearings 167 attached to the rear pair of channel members 14. The rear end of the rearwardly extending fingers 166 are attached to a rectangular frame 168. The ends of the frame 168 are formed with outwardly extending studs 169 which engage elongated slots 170 formed in upwardly extending levers 171. The levers 171 are attached at their bottom ends to a shaft 172 which is rotatively supported in bearings 173 attached to the rear pair of channel members 14. At its center the shaft 172 is provided with a rearwardly extending lever 174 which has a slot 175 engaging a pin 176 extending from a vertical member 177. The vertical member is slidably supported in bearings 178 and is provided at its bottom end with a rack portion 177a. The rack portion meshes with a gear 179 which is fixedly attached to a horizontal shaft 180 rotatively supported in bearings 181. The front end of the horizontal shaft 180 is provided with a handle 181' by which the shaft may be rotated for turning the gear 179 to move the vertical shaft 177 upwards to rotate the shaft 172. When the shaft 172 rotates it will urge the frame 168 inwards to move the rods 52 off the "even" fingers 12 laterally forward to engage the cam cutouts 53 so that when the handle 181' is rotated in the opposite direction the rods 51 will move back to their normal position and draw all the "even" fingers therewith.

The means for moving a shuttle with a horizontal yarn between the "odd" and "even" vertical yarns when one group is rearward and the other is forward, comprise a comb-shaped member 182 having a plurality of teeth 183 which are adapted to be engaged between the vertical yarns 10. At its ends the comb-shaped member 182 is formed with downwardly extending arms 184 which are pivotally mounted upon studs 185 extending from the front pair of channel members 14. Intermediate of their ends the downwardly extending arms 184 are formed with lugs 186 upon which levers 187 are pivotally mounted. The levers 187 extend to the rear of the loom and are pivotally attached to members 188 fixedly attached to a shaft 189 rotatively supported between the bottom members 36. At one end the shaft 189 has a lever 190 fixedly attached thereto. This lever 190 is formed with an elongated slot 191 which is adapted to engage a pin 192 formed on a vertical lever 193 slidably supported at its top end in a bearing 194. The bottom end of the vertical lever 193 is formed with a rack portion 193a which is adapted to engage a gear 194'. The gear 194' is fixedly attached to a shaft 195 rotatively supported in bearings 196. The front end of the shaft 195 is formed with a handle 197 which may be rotated for moving the vertical lever 193 upwards to rotate the shaft 189. When the shaft 189 rotates the member 188 will move to the position illustrated by the dot and dash lines 188' in Fig. 2 to move the rearwardly extending lever 187 to the dot and dash position 187' in the same figure. When the lever 187 moves forward it will pivot the arms 184 to the vertical position shown by the dot and dash lines 184' in Fig. 2.

When the arm 184 reaches the vertical position the teeth 183 will be engaged between the vertical yarns 10 and the device will be in position for shooting the horizontal yarn between the vertical yarns 10. Before the horizontal yarn is shot between the yarns 10 either all the "even" fingers 12 or all the "odd" fingers 12 must be moved forward by rotating the proper handle 165 or 181 to separate these yarns, to permit the horizontal yarn to be passed therethrough.

At each of the ends of the comb-like member 182 a box 198 is fixedly attached thereto. These boxes are provided with an open end 198a which are directed towards each other. Immediately behind the open end 198a of the boxes 198 there are leaf springs 199 which are adapted to receive a shuttle 200. This shuttle 200 has the horizontal yarns 201 wound thereon. Behind each spring 199 a device is provided for shooting the shuttle 200 from beneath the leaf springs 199 and across the comb-shaped member 182 where the shuttle is adapted to slip beneath the leaf spring 199 on the opposite end of the comb-shaped member 182. This shooting device comprises a shaft 202 slidably supported in a bearing 203 attached to the back end of the casing 198. A bracket 204 is attached to the casing 198 below the bearing 203 and is provided with an opening 205 through which the shaft 202 passes for assisting the bearing in supporting the shaft 202 in its horizontal position.

At the front end the shaft 202 is provided with an enlarged head 206 which is adapted to strike the shuttle 200. A spring 207 acts between the enlarged head 206 and the bearing 203 for normally urging the shaft 202 forward to shoot the shutle 200 out of the spring 199. A catch element 208 is pivotally supported on a pin 209 extending between the sides of a slot 210 formed at the top of the casing 198 and is adapted to have one of its ends 208a engage against the enlarged head 206 for holding the shaft 202 in its retracted position against the action of the spring 207. On its extended end the shaft 202 is formed with a handle 211 which may be grasped for manually retracting the shaft 202 against the action of the spring 207. Springs 212 have one of their ends fixedly attached to the top wall of the casing 198 and engage against the catch element 208 for holding it in a normal position in which the end 208a will engage the head 206. The end 208b of the catch element 208 is formed with a head 213 by which the catch 208 may be pivoted for disengaging the end 208b to permit the spring 207 to shoot the shaft 202 forward to quickly urge the shuttle 200 from beneath the spring 199. The shuttle 200 merely rests beneath the spring 199 and the spring 207 should be of a strength sufficient to shoot the shuttle 200 across the entire length of the comb-shaped member 182, and engage it beneath the spring 199 on the other end of the comb-shaped member 182. A string 211a is attached to the shaft 202 in back of the handle 211 and extends through an opening in the channel member 14 and formed with a button 211b which may be grasped to pull the string 211a to retract the shaft 202. A second string 213a is attached to portion of the catch element 208 and extends through an opening in the channel member 14 and has a button 213b at its free end which may be grasped for drawing the string 213a to release the shaft 202.

After the horizontal yarn 201 has been extended across the top of a completed row of knots a comb-shaped weight 214 is adapted to be dropped on the horizontal yarn 201 and the completed row of knots for compressing these knots and horizontal yarn against the completed portion of the rug. At the ends the comb-shaped weight 214 is attached to one end of an expansion spring 215. The spring 215 has its other end fixedly attached to a bracket 216 attached to the front pair of channel members 14. A means is provided for raising the weight 214 and comprises a shaft 217 which is rotatively supported in a plurality of brackets 218. At each end the shaft 217 is formed with a gear 219 which is adapted to engage a rack 220 formed on a vertical extension member 221. A handle 222 is mounted on one end of the shaft 217 by which the shaft may be rotated for rotating the gear 219 to move the racks 220 upwards. The vertical member 221 is formed at its upper ends with inwardly extending lugs 221a upon which a catch element 223 is pivotally supported. The catch elements limited for rotation in one direction each have an end 223. The ends 223 are adapted to be engaged beneath the ends of the weight 214. Thus when the racks 220 move upwards the catch 223 will also move upwards to raise the weight 214. The brackets 216 are formed with downwardly extending portions 216a which are adapted to strike the ends 223b of the catch elements 223 for pivoting these elements to disengage the ends 223a from the ends of the weight 214. When the ends 223 are disengaged from the ends of the weight 214 the expansion spring 215 will push the weight 214 downwards. The weight is formed with a plurality of teeth 214a which are adapted to be engaged between the vertical yarns 10 for pressing the horizontal yarns and the completed knots tightly against the completed portion of the rug.

The front channel members 14 are formed with wheels 224 which are rotatively supported thereon and over which cords 225 are adapted to pass.

One end of the cords 225 are provided with a plurality of weights and the other end of the cords 225 have clips 227 which are adapted to be engaged upon the completed portion of the rug to hold these edges of the completed portion extended so that they will not curl under and move the edge vertical yarns 10 out of the position in which they will conveniently receive the knots.

Figure 24:
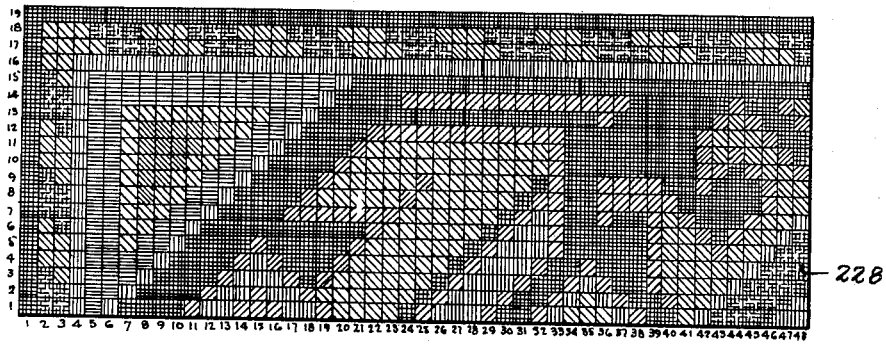
Fig. 24 shows the method for forming the chart of the desired rug or tapestry.
Figure 25:
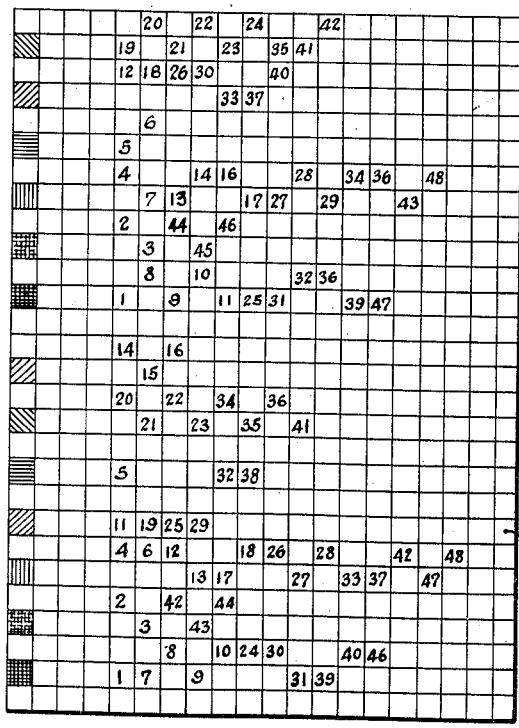
Fig. 25 shows the method for preparing the list of identical colors of knots to be formed in one horizontal row.
Figure 15:
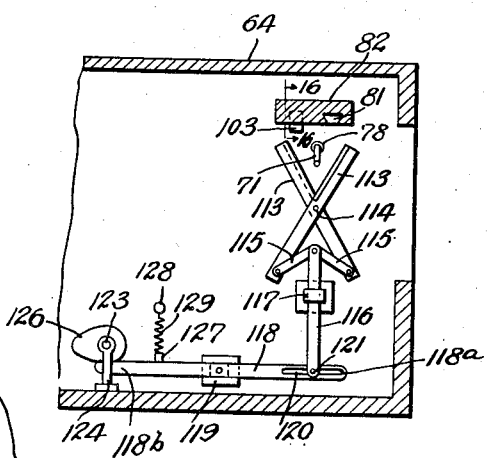
Fig. 15 is a sectional view on the line 15—15 of Fig. 14.
Figure 17:
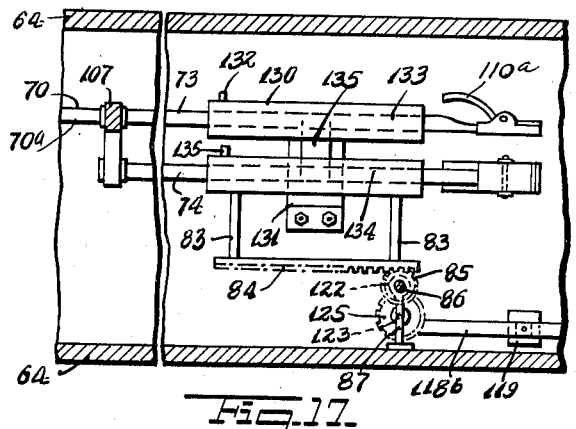
Fig. 17 is a sectional view on the line 17—17 of Fig. 14.
Figure 18:
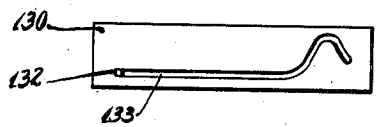
Fig. 18 is a developed view of the cam for moving the upper fingers forward.
Figure 21:
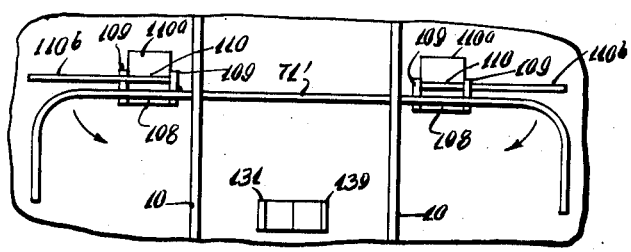
Fig. 21 is a schematic view looking in the direction of the line 21—21 of Fig. 13 and showing the position of the clips for moving the length of yarn forward to the vertical yarns when it is desired to form the knot.
Figure 20:
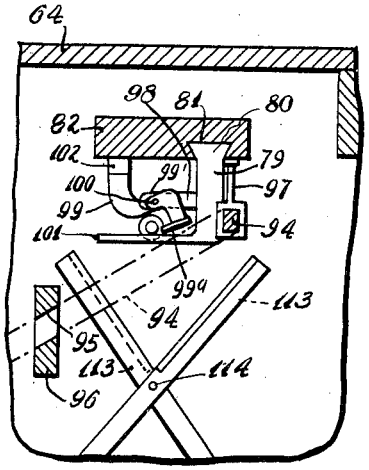
Fig. 20 is a sectional view on the line 20—20 of Fig. 14.
Figure 22:
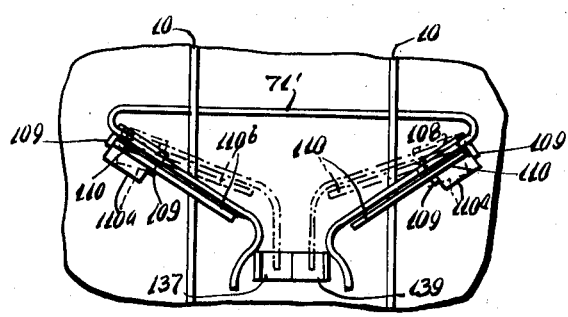
Fig. 22 is a view similar to Fig. 21 but illustrating a further position of the parts during the formation of the knot.
Figure 23:
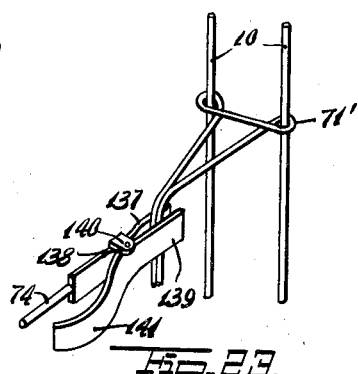
Fig. 23 is a perspective view showing the manner in which the third finger draws the ends of the yarn back for tightening the knot on the vertical yarns.
Figure 16:
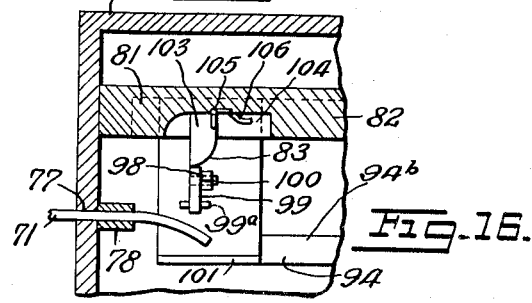
Fig. 16 is a sectional view on the line 16—16 of Fig. 15.

In Fig. 24 a sheet of paper 228 is illustrated which has a design for a rug or tapestry laid out thereon. Along the vertical edge of the rug design the rows are consecutively numbered from the bottom to the top to indicate the rows of the rug. Along the bottom of the rug design each vertical line is also consecutively numbered from left to right to indicate the knots which are to be formed for forming the desired rug or tapestry. Each of the boxes is colored to correspond with the coloring of the finished rug. In Fig. 25 a sheet 229 is shown which is divided into a plurality of small squares. On this sheet the various colors are indicated along the left hand edge and numbers are applied to the colors to indicate the positions at which the knots of these colors are to be tied. This sheet only indicates the knots to be tied for forming the first row of the desired rug, the design of which is shown in Fig. 24. At the bottom of the sheet 229 the first color noted is yellow, and it is noted that yellow knots are to be tied at positions 1, 7, 8, 9, etc., along the length of the first row of knots. This sheet 229 takes the form of a web and is adapted to be mounted within a box 230 which is slidably supported upon the top edge of the keyboard 13. At the bottom the box 230 is provided with a tongue 231 which is adapted to engage a complementary groove 232 for slidably supporting this box. At the front face the box 230 is provided with an elongated slot 233 through which one row of the sheet 229 may be viewed for showing the positions of the knots of that row. The web 229 is wound upon a lower roller 22 and is adapted to be rotated to an upper roller 235 which is provided with a handle 236 by which it may be rotated for moving the web past the slot 233.

The operation of the device is as follows:

The vertical yarns are positioned upon the loom by engaging the desired number of spools 21 on the shaft 19 and the yarns 10 from the spools 21 are passed over the roller 29 through the opening 47 in the tensioning device and over the roller 30. From the roller 30 the vertical yarns are passed through the openings 12ª in the fingers 12 and pass downward over the roller 32 and the roller 34 and are securely attached to the roller 38. For forming a base upon which the knots are to be formed a number of horizontal yarns are positioned between the vertical yarns and the operator is ready for forming the first row of knots. To do this he rotates the handle 236 to position the first row of the web 229 within the slot 230. He notes which color is to be used first and engages a spool having the proper color yarn 71 upon the studs 75 of the knot forming device. He then presses in all of the buttons 62 of the keyboard 13 to eject the proper adjacent pair of fingers 12 which will correspond with the positions upon the web 229. He then positions the knot tying device in its proper position with relation to the first pair of adjacent vertical yarns 10 upon which he desires to form a knot. This is accomplished by disengaging the springs 67 from the opening 69 in the track 11 and sliding the container 64 along the track 11 to its proper position. When the container 64 has been positioned correctly with relation to the first pair of adjacent vertical yarns he presses the handle 70 inwards which causes the knot tying device to operate in the following manner.

The gear 85 will be rotated by the rack 84 which will rotate the sleeve 89 and move the clip 79 along the length of the groove 81. When the clip 79 reaches its fully extended position the lever 99 will engage the cam 103 and move the clip to the open position so that the extended portion of the yarn 71 will be engaged between the open jaws of this clip. Further movement of the sleeve 89 will cause the clip 79 to move back to its normal position, shunting the cam 103 and pulling the yarn 71 across the vertical yarns 10 upon which the knot is to be tied. When the clip 79 nearly reaches its normal position on the clips the fingers 73 will be opened and will grip the extended portion of the yarn 71. Further movement of the handle 70 will cause the cam 126 to pivot the horizontal lever 118 and move the vertical lever 116 upwards to close the scissor jaws 113 and cut off the extended portion 71' of the yarn 71. Still further movement of the handle 70 will cause the clips to move to a position immediately adjacent the vertical yarns 10, after which the cam slot 133 will cause the fingers 73 to rotate outwards with relation to each other to twist the ends of the yarn portions 71' behind the vertical yarns 10. At the same time the finger 74 is moving with the fingers 73 and the clip on the finger 74 will be moved to the open position when the cam tail 141 contacts the cam 142. In the open position the clips on the fingers 73 will raise the ends of the yarn 71'; above the edges of the clip on the finger 74 and drop them into position between the open jaws of the clip on the finger 74.

When the handle 70 is retracted the jaw 139 will move to the closed position and the ends of the yarn 71' will be clamped between the jaws 137 and 139. As the handle 70 moves forward the ends of the yarn 71' will be drawn inwards between the vertical yarns 10 to tightly form the knot upon the vertical yarns 10. When the knot has been drawn tight the ends of the yarn 71' will slip from between the jaws 137 and 139 and the knot will be completed. Then the carriage 64 is moved to the next pair of adjacent vertical yarns and the device is ready for forming the next knot. This procedure is followed until the first row of knots is completed.

After the first row of knots has been completed either all the "even" fingers or all the "odd" fingers 12 are moved forward by rotating either the handle 165 or the handle 181 and the loom is in position for shooting the horizontal thread above the completed row of knots. This is done by pressing downward on the head 213 of the catch member 208 to disengage the end 208ª from the enlarged head 206 of the shaft 202. This permits the spring 207 to shoot the shaft 202 forward to quickly shoot the spool 200 from beneath the leaf spring 199 to cause the spool to roll across the length of the comb-shaped member 182 where the spool will roll beneath the spring 199 of the shooting device on the other end of the comb-shaped member 182.

When this has been completed the comb shaped member is moved out of position with relation to the vertical yarns 10 and the weight 214 is ready to be dropped for compressing the completed knots and the horizontal yarn against the horizontal yarns which have been positioned across the vertical yarns 10 for forming the base upon which the knots are formed. This weight is dropped by rotating the handle 222 which will raise the vertical member 221 upwards until the end 223b contacts the downwardly extending projection 216a on the bracket 216. When these two portions contact each other the catch element 223 will be rotated counter-clockwise to disengage the end 223a from the ends of the weight 214 to permit the expansion spring 215 to quickly urge the weight 214 downwards against the horizontal yarn which has been positioned upon the completed knots.

After the weight 214 has reached its lowered position the operator lowers the catch elements 223 and engages the ends 223a beneath the ends of the weight 214 and proceeds to rotate the handle to raise the vertical members 221 to move the weight 214 out of the way so that he may form the next row of knots. He then rotates either of the handles 165 or 181' to move all the "odd" or "even" fingers 12, depending upon which ones were moved forward when it was desired to shoot the horizontal yarn to set the loom back to its normal position. He is then ready to form the next row of knots. First, he again rotates the handle 236 to position the next row of the web 229 in the slot 233 and proceeds to press the buttons 62 for moving the adjacent pairs of yarns forward upon which he next desires to form knots. The above outlined procedure is followed until the rug or tapestry has been completed.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. An automatic loom for the production of knotted oriental rugs and tapestry, comprising a means for tensioning and supporting a plurality of vertical yarns at top and bottom portions and in a common plane, a track extending transversely across said vertical yarns, a finger for each vertical yarn and having an opening through which the yarn passes, means for slidably supporting said fingers, means for holding said fingers selectively rearwards for drawing the vertical yarns selectively out of said common plane, a keyboard and means for releasing said fingers to move said vertical yarns from their rearward positions in adjacent pairs, means movably mounted on said track for tying knots of yarn material upon said adjacent pairs of said vertical yarns, means for releasing in a group all "odd" fingers from their rearward positions, means for releasing in a group all "even" fingers from their rearward positions, means for moving a shuttle with a horizontal yarn between the "odd" and "even" vertical yarns when one group is rearward and the other is forward.

2. An automatic loom for the production of knotted oriental rugs and tapestry, comprising a means for tensioning and supporting a plurality of vertical yarns at top and bottom portions and in a common plane, a track extending transversely across said vertical yarns, a finger for each vertical yarn and having an opening through which the yarn passes, means for slidably supporting said fingers, means for holding said fingers selectively rearwards for drawing the vertical yarns selectively out of said common plane, a keyboard and means for releasing said fingers to move said vertical yarns from their rearward positions in adjacent pairs, means movably mounted on said track for tying knots of yarn material upon said adjacent pairs of said vertical yarns, means for releasing in a group all "odd" fingers from their rearward positions, means for releasing in a group all "even" fingers from their reaward positions, means for moving a shuttle with a horizontal yarn between the "odd" and "even" vertical yarns when one group is rearward and the other is forward, said means for tensioning and supporting said vertical yarns comprising a shaft upon which the spools having said vertical yarns are rotatively supported, a tensioning device through which said yarns are adapted to pass, after which the yarns pass through the openings in said fingers and then extend to the bottom of said loom and are attached to a roller fixed to a shaft extending transversely of said loom.

3. An automatic loom for the production of knotted oriental rugs and tapestry, comprising a means for tensioning and supporting a plurality of vertical yarns at top and bottom portions and in a common plane, a track extending transversely across said vertical yarns, a finger for each vertical yarn and having an opening through which the yarn passes, means for slidably supporting said fingers, means for holding said fingers selectively rearwards for drawing the vertical yarns selectively out of said common plane, a keyboard and means for releasing said fingers to move said vertical yarns from their rearward positions in adjacent pairs, means movably mounted on said track for tying knots of yarn material upon said adjacent pairs of said vertical yarns, means for releasing in a group all "odd" fingers from their rearward positions, means for releasing in a group all "even" fingers from their rearward positions, means for moving a shuttle with a horizontal yarn between the "odd" and "even" vertical yarns when one group is rearward and the other is forward, said means for tensioning and supporting said vertical yarns comprising a shaft upon which the spools having said vertical yarns are rotatively supported, a tensioning device through which said yarns are adapted to pass, after which the yarns pass through the openings in said fingers and then extend to the bottom of said loom and are attached to a roller fixed to a shaft extending transversely of said loom, said tensioning device comprising a bracket extending transversely of said loom and having a plurality of depending fingers one for each of said vertical yarns, a spring attached to the bottom end of said fingers, and a tension plate attached to the free end of said spring and having an opening through which said vertical yarns pass.

4. An automatic loom for the production of knotted oriental rugs and tapestry, comprising a means for tensioning and supporting a plurality of vertical yarns at top and bottom portions and in a common plane, a track extending transversely across said vertical yarns, a finger for each vertical yarn and having an opening through which the yarn passes, means for slidably supporting said fingers, means for holding said fingers selectively rearwards for drawing the vertical yarns selectively out of said common plane, a keyboard and means for releasing said fingers to move said vertical yarns from their rearward positions, in adjacent pairs, means movably mounted on said track for tying knots of yarn material upon said adjacent pairs of said vertical yarns, means for releasing in a group all "odd" fingers from their rearward positions, means for releasing in a group all "even" fingers from their rearward positions, means for moving a shuttle with a horizontal yarn between the "odd" and "even" vertical yarns when one group is rearward and the other is forward, said fingers having elongated slots intermediate of their ends through which a shaft extends for horizontally slidably supporting said fingers, and said fingers being adapted to be moved forward by the tension of said vertical yarns as created by said tensioning means.

5. An automatic loom for the production of knotted oriental rugs and tapestry, comprising a means for tensioning and supporting a plurality of vertical yarns at top and bottom portions and in a common plane, a track extending transversely across said vertical yarns, a finger for each vertical yarn and having an opening through which the yarn passes, means for slidably supporting said fingers, means for holding said fingers selectively rearwards for drawing the vertical yarns selectively rearwards for drawing the vertical yarns selectively out of said common plane, a keyboard and means for releasing said fingers to move said vertical yarns from their rearward positions in adjacent pairs, means movably mounted on said track for tying knots of yarn material upon said adjacent pairs of said vertical yarns, means for releasing in a group all "odd" fingers from their rearward positions, means for releasing in a group all "even" fingers from their rearward positions, means for moving a shuttle with a horizontal yarn between the "odd" and "even" vertical yarns when one group is rearward and the other is forward, said means for holding said fingers selectively rearwards for drawing the vertical yarns out of said common plane comprising rods adapted to engage cam cutouts formed in the rear ends of said fingers, rearwardly extending fingers attached to said rods and slidably engaging bearings, a rectangular frame to which the rear end of said fingers are attached, and means for moving said frame backwards with said cam cutouts engaging said rods for drawing certain of said fingers backwards.

6. An automatic loom for the production of knotted oriental rugs and tapestry, comprising a means for tensioning and supporting a plurality of vertical yarns at top and bottom portions and in a common plane, a track extending transversely across said vertical yarns, a finger for each vertical yarn and having an opening through which the yarn passes, means for slidably supporting said fingers, means for holding said fingers selectively rearwards for drawing the vertical yarns selectively out of said common plane, a keyboard and means for releasing said fingers to move said vertical yarns from their rearward positions in adjacent pairs, means movably mounted on said track for tying knots of yarn material upon said adjacent pairs of said vertical yarns, means for releasing in a group all "odd" fingers from their rearward positions, means for releasing in a group all "even" fingers from their rearward positions, means for moving a shuttle with a horizontal yarn between the "odd" and "even" vertical yarns when one group is rearward and the other is forward, said means for holding said fingers selectively rearwards for drawing the vertical yarns out of said common plane comprising rods adapted to engage cam cutouts formed in the rear ends of said fingers, rearwardly extending fingers attached to said rods and slidably engaging bearings, a rectangular frame to which the rear end of said fingers are attached, and means for moving said frame backwards with said cam cutouts engaging said rods for drawing certain of said fingers backwards, said latter-mentioned means comprising studs extending from said frame, levers having one of their ends engaging said studs and other of their ends fixedly attached to a shaft rotatively supported transversely of said loom, a member extending from said shaft, a vertical member slidably supported vertically of said loom and being pivotally connected at one of its ends with said member, a rack formed on the bottom end of said vertical member, a shaft rotatively supported and having a gear at one of its ends meshing with said rack and a handle on the other end of said shaft for rotating said shaft to move said vertical member forwards and downwards to cause said frame to move backwards and forwards.

7. An automatic loom for the production of knotted oriental rugs and tapestry, comprising a means for tensioning and supporting a plurality of vertical yarns at top and bottom portions and in a common plane, a track extending transversely across said vertical yarns, a finger for each vertical yarn and having an opening through which the yarn passes, means for slidably supporting said fingers, means for holding said fingers selectively rearwards for drawing the vertical yarns selectively out of said common plane, a keyboard and means for releasing said fingers to move said vertical yarns from their rearward positions in adjacent pairs, means movably mounted on said track for tying knots of yarn material upon said adjacent pairs of said vertical yarns, means for releasing in a group all "odd" fingers from their rearward positions, means for releasing in a group all "even" fingers from their rearward positions, means for moving a shuttle with a horizontal yarn between the "odd" and "even" vertical yarns when one group is rearward and the other is forward, said means for releasing said fingers to move said vertical yarns forward in adjacent pairs comprising U-shaped members having one of their arms pivotally supported on a shaft extending transversely of said loom, said U-shaped member having the other of its ends formed with an enlarged head and adapted to engage the top edge of one of said fingers, means for pivoting said U-shaped member to urge said head downwards to free said fingers so that it may move forward, and means for connecting said fingers to its next adjacent finger to free said next adjacent finger when said finger is freed by said U-shaped member.

8. An automatic loom for the production of knotted oriental rugs and tapestry, comprising a means for tensioning and supporting a plurality of vertical yarns at top and bottom portions and in a common plane, a track extending transversely across said vertical yarns, a finger for each vertical yarn and having an opening through which the yarn passes, means for slidably supporting said fingers, means for holding said fingers selectively rearwards for drawing the vertical yarns selectively out of said common plane, a keyboard and means for releasing said fingers to move said vertical yarns from their rearward positions in adjacent pairs, means movably mounted on said track for tying knots of yarn material upon said adjacent pairs of said vertical yarns, means for releasing in a group all "odd" fingers from their rearward positions, means for releasing in a group all "even" fingers from their rearward positions, means for moving a shuttle with a horizontal yarn between the "odd" and "even" vertical yarns when one group is rearward and the other is forward, said means for releasing said fingers to move said vertical yarns forward in adjacent pairs comprising U-shaped members having one of their arms pivotally supported on a shaft extending transversely of said loom, said U-shaped member having the other of its ends formed with an enlarged head and adapted to engage the top edge of one of said fingers, means for pivoting said U-shaped member to urge said head downwards to free said fingers so that it may move forward, and means for connecting said fingers to its next adjacent finger to free said next adjacent finger when said finger is freed by said U-shaped member, said latter-mentioned means comprising a member attached to said finger adapted to be moved by said U-shaped member, and a foot portion extending from said member and adapted to engage the top edge of the next adjacent finger to free said next adjacent finger.

9. An automatic loom for the production of knotted oriental rugs and tapestry, comprising a means for tensioning and supporting a plurality of vertical yarns at top and bottom portions and in a common plane, a track extending transversely across said vertical yarns, a finger for each vertical yarn and having an opening through which the yarn passes, means for slidably supporting said fingers, means for holding said fingers selectively rearwards for drawing the vertical yarns selectively out of said common plane, a keyboard and means for releasing said fingers to move said vertical yarns from their rearward positions in adjacent pairs, means movably mounted on said track for tying knots of yarn material upon said adjacent pairs of said vertical yarns, means for releasing in a group all "odd" fingers from their rearward positions, means for releasing in a group all "even" fingers from their rearward positions, means for moving a shuttle with a horizontal yarn between the "odd" and "even" vertical yarns when one group is rearward and the other is forward, said means for tying knots of yarn material on said adjacent pairs of vertical yarns comprising a carriage mounted on said track and movable to positions to the front of adjacent pairs of said vertical yarns, an extendable handle mounted on said carriage, means operated by said handle for drawing a length of yarn from a supply spool across a pair of said vertical yarns, a pair of fingers manually extendable by said handle for gripping said length of yarn at spaced positions outside of said pair of said vertical yarns, means for cutting off said length of yarn after said pair of fingers support the same, means for causing said fingers to turn in extended positions and move the ends of the length of yarn between said pair of vertical yarns, and a third finger operable by said handle for extending between said pair of vertical yarns and gripping the ends of said length of yarn and pulling the ends between the vertical yarn to form a knot when said handle is retracted.

10. An automatic loom for the production of knotted oriental rugs and tapestry, comprising a means for tensioning and supporting a plurality of vertical yarns at top and bottom positions and in a common plane, a track extending transversely across said vertical yarns, a finger for each vertical yarn and having an opening through which the yarn passes, means for slidably supporting said fingers, means for holding said fingers selectively rearwards for drawing the vertical yarns selectively out of said common plane, a keyboard and means for releasing said fingers to move said vertical yarns from their rearward positions in adjacent pairs, means movably mounted on said track for tying knots of yarn material upon said adjacent pairs of said vertical yarns, means for releasing in a group all "odd" fingers from their rearward positions, means for releasing in a group all "even" fingers from their rearward positions, means for moving a shuttle with a horizontal yarn between the "odd" and "even" vertical yarns when one group is rearward and the other is forward, said means for tying knots of yarn material on said adjacent pairs of vertical yarns comprising a carriage mounted on said track and movable to positions to the front of adjacent pairs of said vertical yarns, an extendable handle mounted on said carriage, means operated by said handle for drawing a length of yarn from a supply spool across a pair of said vertical yarns, a pair of fingers manually extendable by said handle for gripping said length of yarn at spaced positions outside of said pair of said vertical yarns, means for cutting off said length of yarn after said pair of fingers support the same, means for causing said fingers to turn in extended positions and move the ends of the length of yarn between said pair of vertical yarns, and a third finger operable by said handle for extending between said pair of vertical yarns and gripping the ends of said length of yarn and pulling the ends between the vertical yarn to form a knot when said handle is retracted, said means operated by said handle for drawing a length of yarn from a supply spool comprising a clip having a portion slidably supported within a groove formed in a track element, a rack attached to said third finger and adapted to move therewith when said third finger is moved by said handle, a shaft rotatively supported in bearings, a gear fixedly attached to said shaft and meshing with said rack to rotate said shaft, a sleeve freely mounted on said shaft, a pawl and ratchet arranged between said sleeve and said shaft to rotate said sleeve when said rack moves forward and permits said sleeve to idle when said rack moves backwards, and a U-shaped member having one of its ends attached to said clip and having the other of its ends formed to engage an 8-shaped cam groove formed in said sleeve to move said clip along the length of said groove to engage the end of said yarn and move said clip backwards to its normal position.

11. An automatic loom for the production of knotted oriental rugs and tapestries, comprising a means for tensioning and supporting a plurality of vertical yarns at top and bottom portions and in a common plane, a track extending transversely across said vertical yarns, a finger for each vertical yarn and having an opening through which the yarn passes, means for slidably supporting said fingers, means for holding said fingers selectively rearwards for drawing the vertical yarns selectively out of said common plane, a keyboard and means for releasing said fingers to move said vertical yarns from their rearward positions in adjacent pairs, means movably mounted on said track for tying knots of yarn material upon said adjacent pairs of said vertical yarns, means for releasing in a group all "odd" fingers from their rearward positions, means for releasing in a group all "even" fingers from their rearward positions, means for moving a shuttle with a horizontal yarn between the "odd" and "even" vertical yarns when one group is rearward and the other is forward, said means for tying knots of yarn material on said adjacent pairs of vertical yarns comprising a carriage mounted on said track and movable to positions to the front of adjacent pairs of said vertical yarns, an extendable handle mounted on said carriage, means operated by said handle for drawing a length of yarn from a supply spool across a pair of said vertical yarns, a pair of fingers manually extendable by said handle for gripping said length of yarn at spaced positions outside of said pair of said vertical yarns, means for cutting off said length of yarn after said pair of fingers support the same, means for causing said fingers to turn in extended positions and move the ends of the length of yarn between said pair of vertical yarns, and a third finger operable by said handle for extending between said pair of vertical yarns and gripping the ends of said length of yarn and pulling the ends between the vertical yarn to form a knot when said handle is retracted, said means operated by said handle for drawing a length of yarn from a supply spool comprising a clip having a portion slidably supported within a groove formed in a track element, a rack attached to said third finger and adapted to move therewith when said third finger is moved by said handle, a shaft rotatively supported in bearings, a gear fixedly attached to said shaft and meshing with said rack to rotate said shaft, a sleeve freely mounted on said shaft, a pawl and ratchet arranged between said sleeve and said shaft to rotate said sleeve when said rack moves forward and permits said sleeve to idle when said rack moves backwards, and a U-shaped member having one of its ends attached to said clip and having the other of its ends formed to engage an 8-shaped cam groove formed in said sleeve to move said clip along the length of said groove to engage the end of said yarn and move said clip backwards to its normal position, said means for cutting off said extended length of yarn comprising a gear attached to one end of said shaft, a second shaft rotatively supported in a bearing and having a larger gear on one of its ends meshing with said gear, and a cam mounted on the other end of said second shaft, and a pair of scissor jaws adapted to be controlled by said cam to close said scissors once for every two rotations of said first-mentioned shaft to cut the extended portion of said yarn when said clip reaches its normal position.

12. An automatic loom for the production of knotted oriental rugs and tapestries, comprising a means for tensioning and supporting a plurality of vertical yarns at top and bottom portions and in a common plane, a track extending transversely across said vertical yarns, a finger for each vertical yarn and having an opening through which the yarn passes, means for slidably supporting said fingers, means for holding said fingers selectively rearwards for drawing the vertical yarns selectively out of said common plane, a keyboard and means for releasing said fingers to move said vertical yarns from their rearward positions in adjacent pairs, means movably mounted on said track for tying knots of yarn material upon said adjacent pairs of said vertical yarns, means for releasing in a group all "odd" fingers from their rearward positions, means for releasing in a group all "even" fingers from their rearward positions, means for moving a shuttle with a horizontal yarn between the "odd" and "even" vertical yarns when one group is rearward and the other is forward, said means for tying knots of yarn material on said adjacent pairs of vertical yarns comprising a carriage mounted on said track and movable to positions to the front of adjacent pairs of said vertical yarns, an extendable handle mounted on said carriage, means operated by said handle for drawing a length of yarn from a supply spool across a pair of said vertical yarns, a pair of fingers manually extendable by said handle for gripping said length of yarn at spaced positions outside of said pair of said vertical yarns, means for cutting off said length of yarn after said pair of fingers support the same, means for causing said fingers to turn in extended positions and move the ends of the length of yarn between said pair of vertical yarns, and a third finger operable by said handle for extending between said pair of vertical yarns and gripping the ends of said length of yarn and pulling the ends between the vertical yarn to form a knot when said handle is retracted, said means for causing said fingers to turn in the extended position comprising sleeves fixedly attached to brackets supported within said carriage and through which said fingers are adapted to extend, an upwardly extending projection formed on said finger and engageable into a cam slot formed in said sleeve to rotate said fingers in the extended positions thereof to raise and lower the ends of said yarn to properly position them within the open jaws of a clip attached to said third finger.

13. An automatic loom for the production of knotted oriental rugs and tapestry, comprising a means for tensioning and supporting a plurality of vertical yarns at top and bottom portions and in a common plane, a track extending transversely across said vertical yarns, a finger for each vertical yarn and having an opening through which the yarn passes, means for slidably supporting said fingers, means for holding said fingers selectively rearwards for drawing the vertical yarns selectively out of said common plane, a keyboard and means for releasing said fingers to move said vertical yarns from their rearward positions in adjacent pairs, means movably mounted on said track for tying knots of yarn material upon said adjacent pairs of said vertical yarns, means for releasing in a group all "odd" fingers from their rearward positions, means for releasing in a group all "even" fingers from their rearward positions, means for moving a shuttle with a horizontal yarn between the "odd" and "even" vertical yarns when one group is rearward and the other is forward, said latter-mentioned means comprising a comb-shaped member attached at its ends to arms fixedly attached to a shaft rotatively supported transversely of said loom, fingers formed on said comb-shaped member and engageable between said vertical yarns, and means on the ends of said arm for shooting a spool having yarn therein between said vertical fingers.

14. An automatic loom for the production of knotted oriental rugs and tapestries, comprising a means for tensioning and supporting a plurality of vertical yarns at top and bottom portions and in a common plane, a track extending transversely across said vertical yarns, a finger for each vertical yarn and having an opening through which the yarn passes, means for slidably supporting said fingers, means for holding said fingers selectively rearwards for drawing the vertical yarns selectively out of said common plane, a keyboard and means for releasing said fingers to move said vertical yarns from their rearward positions in adjacent pairs, means movably mounted on said track for tying knots of yarn material upon said adjacent pairs of said vertical yarns, means for releasing in a group all "odd" fingers from their rearward positions, means for releasing in a group all "even" fingers from their rearward positions, means for moving a shuttle with a horizontal yarn between the "odd" and "even" vertical yarns when one group is rearward and the other is forward, said latter-mentioned means comprising a comb-shaped member attached at its ends to arms fixedly attached to a shaft rotatively supported transversely of said loom, fingers formed on said comb-shaped member and engageable between said vertical yarns, and means on the ends of said arm for shooting a spool having yarn therein between said vertical fingers, said means comprising containers attached to the ends of said comb-shaped member and having open ends directed toward each other, leaf springs mounted within said container and immediately back of said open end for holding said spool in position, and a spring pressed plunger for striking against said spool to shoot said spool across said comb-shaped member, and means for holding said spring pressed plunger in its rearward position.

15. An automatic loom for the production of knotted oriental rugs and tapestries, comprising a means for tensioning and supporting a plurality of vertical yarns at top and bottom portions and in a common plane, a track extending transversely across said vertical yarns, a finger for each vertical yarn and having an opening through which the yarn passes, means for slidably supporting said fingers, means for holding said fingers selectively rearwards for drawing the vertical yarns selectively out of said common plane, a keyboard and means for releasing said fingers to move said vertical yarns from their rearward positions in adjacent pairs, means movably mounted on said track for tying knots of yarn material upon said adjacent pairs of said vertical yarns, means for releasing in a group all "odd" fingers from their rearward positions, means for releasing in a group all "even" fingers from their rearward positions, means for moving a shuttle with a horizontal yarn between the "odd" and "even" vertical yarns when one group is rearward and the other is forward, said latter-mentioned means comprising a comb-shaped member attached at its ends to arms fixedly attached to a shaft rotatively supported transversely of said loom, fingers formed on said comb-shaped member and engageable between said vertical yarns, and means on the ends of said arm for shooting a spool having yarn therein between said vertical fingers, said means comprising containers attached to the ends of said comb-shaped member and having open ends directed toward each other, leaf springs mounted within said container and immediately back of said open end for holding said spool in position, and a spring pressed plunger for striking against said spool to shoot said spool across said comb-shaped member, and means for holding said spring pressed plunger in its rearward position, said means comprising a manually releasable catch element.

16. An automatic loom for the production of knotted oriental rugs and tapestries, comprising a means for tensioning and supporting a plurality of vertical yarns at top and bottom portions and in a common plane, a track extending transversely across said vertical yarns, a finger for each vertical yarn and having an opening through which the yarn passes, means for slidably supporting said fingers, means for holding said fingers selectively rearwards for drawing the vertical yarns selectively out of said common plane, a keyboard and means for releasing said fingers to move said vertical yarns from their rearward positions in adjacent pairs, means movably mounted on said track for tying knots of yarn material upon said adjacent pairs of said vertical yarns, means for releasing in a group all "odd" fingers from their rearward positions, means for releasing in a group all "even" fingers from their rearward positions, means for moving a shuttle with a horizontal yarn between "odd" and "even" vertical yarns when one group is reaward and the other is forward, a weight vertically slidably mounted transversely of said loom and having a plurality of fingers engageable between said vertical yarns for pressing said completed knots and said horizontal yarn against the completed portion of said rug or tapestry, and means for raising and dropping said weight.

17. An automatic loom for the production of knotted oriental rugs and tapestries, comprising a means for tensioning and supporting a plurality of vertical yarns at top and bottom portions and in a common plane, a track extending transversely across said vertical yarns, a finger for each vertical yarn and havinfg an opening through which the yarn passes, means for slidably supporting said fingers, means for holding said fingers selectively rearwards for drawing the vertical yarns selectively out of said common plane, a keyboard and means for releasing said fingers to move said vertical yarns from their rearward positions in adjacent pairs, means movably mounted on said track for tying knots of yarn material upon said adjacent pairs of said vertical yarns, means for releasing in a group all "odd" fingers from their rearward positions, means for releasing in a group all "even" fingers from their rearward positions, means for moving a shuttle with a horizontal yarn between the "odd" and "even" vertical yarns when one group is rearward and the other is forward, a weight vertically slidably mounted transversely of said loom and having a plurality of fingers engageable between said vertical yarns for pressing said completed knots and said horizontal yarn against the completed portion or said rug or tapestry, and means for raising and dropping said weight, said latter-mentioned means comprising a shaft rotatively supported between brackets, gears mounted on the ends of said shaft, vertical members having racks meshing with said gears, inwardly extending lugs formed on the top of said vertical members, and catch members pivotally mounted on said inwardly extending lugs and being adapted to be engaged beneath the ends of said weight, and means for pivoting said catch members to disengage them from said weight to permit said weight to move downwards, and resilient means for urging said weight downwards in its freed condition.

18. An automatic loom for the production of knotted oriental rugs and tapestries, comprising a means for tensioning and supporting a plurality of vertical yarns at top and bottom portions and in a common plane, a track extending transversely across said vertical yarn, a finger for each vertical yarn and having an opening through which the yarn passes, means for slidably supporting said fingers, means for holding said fingers selectively rearwards for drawing the vertical yarns selectively out of said common plane, a keyboard and means for releasing said fingers to move said vertical yarns from their rearward positions in adjacent pairs, means movably mounted on said track for tying knots of yarn material upon said adjacent pairs of said vertical yarns, means for releasing in a group all "odd" fingers from their rearward positions, means for releasing in a group all "even" fingers from their rearward positions, means for moving a shuttle with a horizontal yarn between the "odd" and "even" vertical yarns when one group is rearward and the other is forward, a weight vertically slidably mounted transversely of said loom and having a plurality of fingers engageable between said vertical yarns for pressing said completed knots and said horizontal yarn against the completed portion or said rug or tapestry, and means for raising and dropping said weight, said latter-mentioned means comprising a shaft rotatively supported between brackets, gears mounted on the ends of said shaft, vertical members having racks meshing with said gears, inwardly extending lugs formed on the top of said vertical members, and catch members pivotally mounted on said inwardly extending lugs and being adapted to be engaged beneath the ends of said weight, and means for pivoting said catch members to disengage them from said weight to permit said weight to move downwards, and resilient means for urging said weight downwards in its freed condition, said means for releasing said catch members comprising a bracket attached to said loom and having a downwardly extending projection adapted to engage a portion of said catch member in the raised position of said vertical member to pivot said catch members.

19. An automatic loom for the production of knotted oriental rugs and tapestries, comprising a means for tensioning and supporting a plurality of vertical yarns at top and bottom portions and in a common plane, a track extending transversely across said vertical yarns, a finger for each vertical yarn and having an opening through which the yarn passes, means for slidably supporting said fingers, means for holding said fingers selectively rearwards for drawing the vertical yarns selectively out of said common plane, a keyboard and means for releasing said fingers to move said vertical yarns from their rearward positions in adjacent pairs, means movably mounted on said track for tying knots of yarn material upon said adjacent pairs of said vertical yarns, means for releasing in a group all "odd" fingers from their rearward positions, means for releasing in a group all "even" fingers from their rearward positions, means for moving a shuttle with a horizontal yarn between the "odd" and "even" vertical yarns when one group is rearward and the other is forward, a weight vertically slidably mounted transversely of said loom and having a plurality of fingers engageable between said vertical yarns for pressing said completed knots and said horizonatal yarn against pleted knots and said horizontal yarn against the completed portion of said rug or tapestry, and means for raising and dropping said weight, said latter-mentioned means comprising a shaft rotatively supported between brackets, gears mounted on the ends of said shaft, vertical members having racks meshing with said gears, inwardly extending lugs formed on the top of said vertical members, and catch members pivotally mounted on said inwardly extending lugs and being adapted to be engaged beneath the ends of said weight, and means for pivoting said catch members to disengage them from said weight to permit said weight to move downwards, and resilient means for urging said weight downwards in its free condition, said means for releasing said catch members comprising a bracket attached to said loom and having a downwardly extending projection adapted to engage a portion of said catch member in the raised position of said vertical member to pivot said catch members, said resilient means comprising an expansion spring operating between said outwardly extending brackets and the ends of said weight.

20. A method for producing knotted oriental rugs and tapestries, consisting of creating a design and dividing it into a plurality of horizontal and vertical areas, the horizontal areas representing the horizontal rows of knots of the finished article, and the vertical areas representing the vertical yarns of the finished article, preparing a list of the knots of identical color in each horizontal area, stringing up the vertical yarns in a common plane, selectively moving the vertical yarns of the different color groups according to said list out of said vertical plane and applying knots thereof of the correct colors until an entire horizontal area has been provided with the knots, separating the "odd" and "even" yarns and passing the horizontal yarn between them, packing down the line of yarn and the line of knots, and then proceeding with the application of knots to the next horizontal row.

ADALBERT BERETVÁS.